United States Patent
Xie et al.

(10) Patent No.: US 6,931,425 B2
(45) Date of Patent: Aug. 16, 2005

(54) METHOD AND APPARATUS FOR GENERATING RANDOM NUMBERS BASED ON FILTER COEFFICIENTS OF AN ADAPTIVE FILTER

(75) Inventors: WenXiang Xie, Singapore (SG); Wei Loon Ng, Singapore (SG); Eng Hock Lim, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 600 days.

(21) Appl. No.: 10/175,771

(22) Filed: Jun. 20, 2002

(65) Prior Publication Data

US 2003/0172096 A1 Sep. 11, 2003

Related U.S. Application Data

(60) Provisional application No. 60/362,912, filed on Mar. 8, 2002.

(51) Int. Cl.[7] .................................................. G06F 1/02
(52) U.S. Cl. .................................... 708/250; 708/255
(58) Field of Search .............................. 708/250–256

(56) References Cited

U.S. PATENT DOCUMENTS

| | | | |
|---|---|---|---|
| 4,571,546 A | 2/1986 | Wilkinson | 328/61 |
| 4,641,102 A | 2/1987 | Coulthart et al. | 328/62 |
| 4,835,721 A * | 5/1989 | Becker et al. | 708/250 |
| 4,855,690 A | 8/1989 | Dias | 331/78 |
| 4,855,944 A * | 8/1989 | Hart | 708/3 |
| 5,539,711 A | 7/1996 | Mitani | 369/32 |
| 6,034,618 A | 3/2000 | Tatebayashi et al. | 340/825.34 |
| 6,249,009 B1 | 6/2001 | Kim et al. | 250/580 |
| 6,650,687 B1 * | 11/2003 | McDonough | 375/140 |

FOREIGN PATENT DOCUMENTS

| | | |
|---|---|---|
| EP | 0 596 662 | 5/1994 |
| EP | 0 828 349 | 3/1998 |
| EP | 0 878 907 | 9/2000 |
| EP | 1 124 350 | 8/2001 |

* cited by examiner

*Primary Examiner*—D. H. Malzahn
(74) *Attorney, Agent, or Firm*—Theodore M. Magee; Westman, Champlin & Kelly, P.A.

(57) ABSTRACT

A method and random number generator are provided for generating random numbers. Under the method, a filter coefficient value that is used by a filter to filter an input signal is set and then compared to a default value for the filter coefficient. At least one bit of the random number is then set based on the comparison between the filter coefficient value and the default value.

20 Claims, 4 Drawing Sheets

METHOD AND APPARATUS FOR GENERATING RANDOM NUMBERS BASED ON FILTER COFFICIENTS OF AN ADAPTIVE FILTER

CROSS-REFERENCE TO RELATED APPLICATION

This application claims priority from U.S. Provisional Application 60/362,912 filed on Mar. 8, 2002 for inventors WenXiang Xie, Wei Loon Ng, and Eng Hock Lim and entitled Method of Generating True Random Numbers in Disc Drives.

FIELD OF THE INVENTION

The present invention relates generally to data receivers. In particular, the present invention relates to generating random numbers in data receivers.

BACKGROUND OF THE INVENTION

Mass data storage devices have begun to be used in applications outside of personal computers. In some applications, especially in the consumer electronics area, there is a desire to make the storage device secure such that the device cannot be accessed by a host other than the host initially shipped with the device.

One way to make a storage device secure is to use a cryptographic algorithm that relies on a secret quantity such as a password or cryptographic key. Such algorithms are typically open to the public and as such rely heavily on the secret quantity. The strength of the secret quantity is a function of how easy it is to guess the quantity. In general, the strongest secret quantity will be one that is selected through a true random process, such as random number generation.

In current disc drives, random numbers are generated by means of a set of internal timers. In particular, the values produced by these timers are sampled at some point in time based on some algorithm. The sampled values are used to form the random number. Unfortunately, numbers produced in this manner are not truly random and in fact it has been found that the same number is likely to be generated twice using the existing system. In addition, if the algorithm becomes known, the numbers produced by prior art drives can be guessed based on the nominal clock speed of the disc drive processor.

As such, a mechanism is needed to generate true random numbers in a data receiver such as a read channel in a disc drive.

SUMMARY OF THE INVENTION

A method and random number generator are provided for generating random numbers. Under the method, a filter coefficient value that is used by a filter to filter an input signal is set and then compared to a default value for the filter coefficient. At least one bit of the random number is then set based on the comparison between the filter coefficient value and the default value.

Other features and benefits that characterize embodiments of the present invention will be apparent upon reading the following detailed description and review of the associated drawings.

DETAILED DESCRIPTION OF ILLUSTRATIVE EMBODIMENTS

The present invention calculates true random numbers in a data receiver without adding additional hardware to the data receiver. To do this, the present invention takes advantage of a set of filter coefficients that were previously only used to define an adaptive filter used to shape a read signal.

Figure 1:
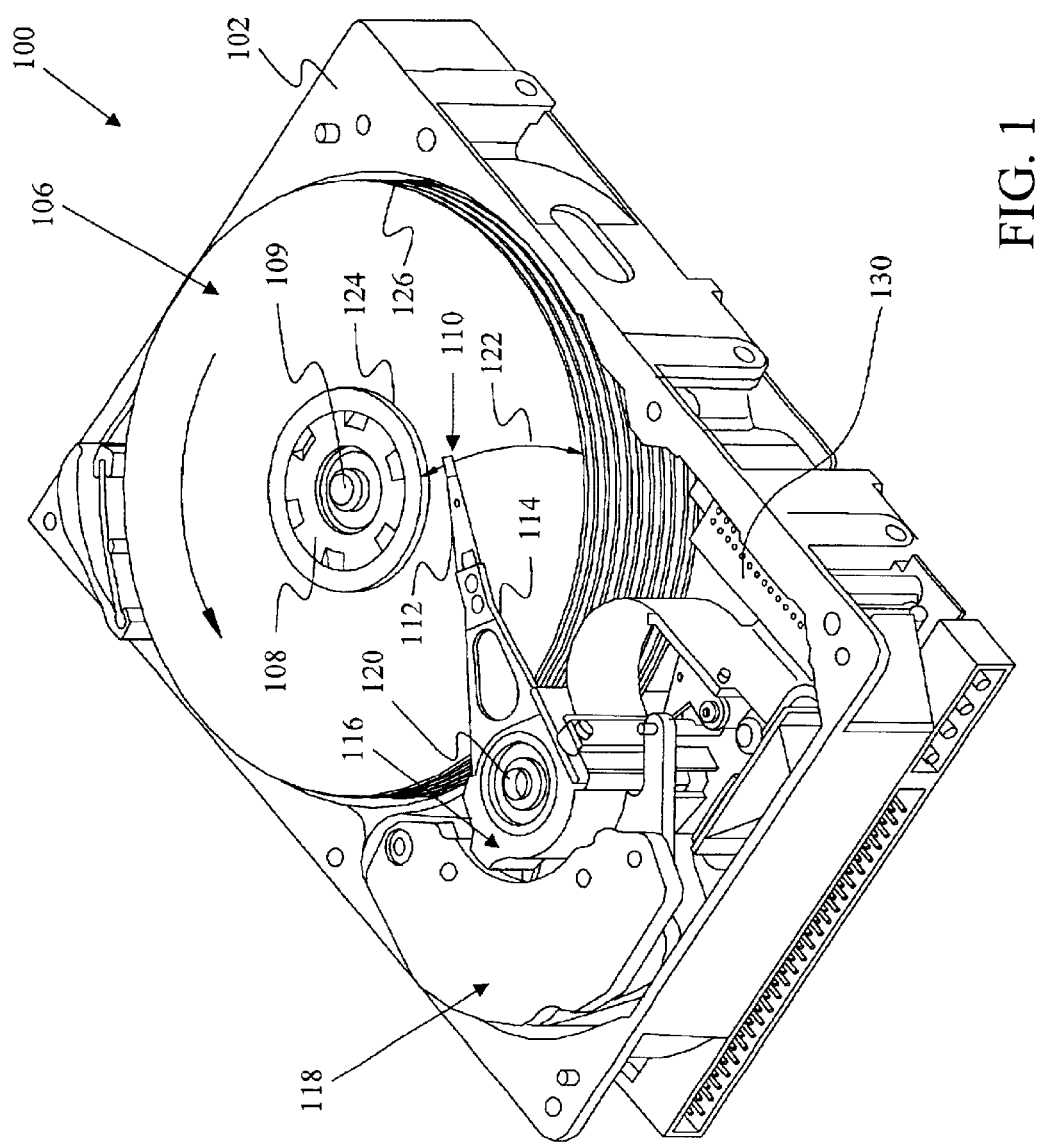
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. Each slider 110 includes at least one head that generates a read signal based on a magnetic pattern stored in the disc surface. This read signal is processed by a read channel (not shown), a type of data receiver, to identify data represented by the magnetic pattern.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
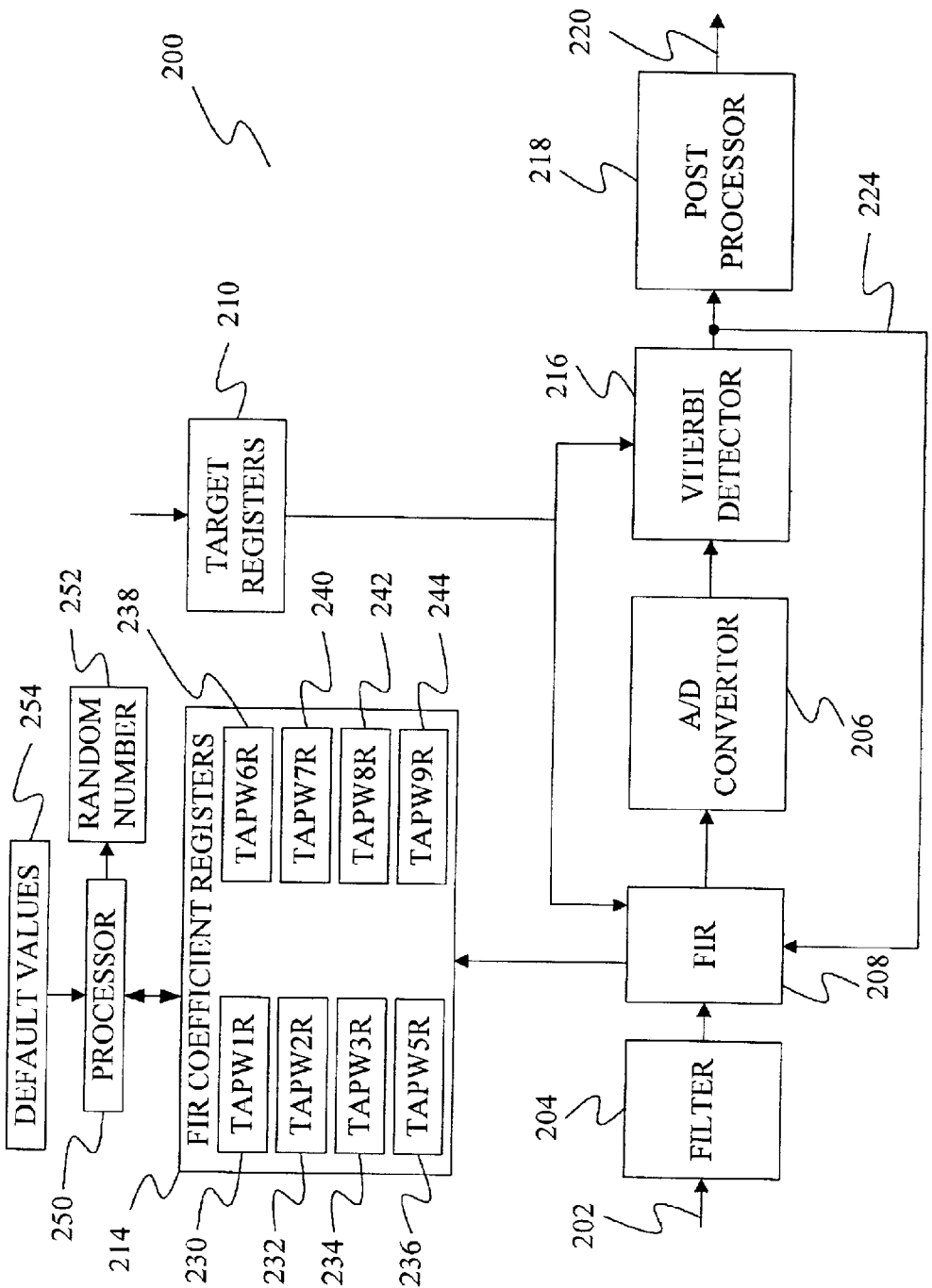
FIG. 2 is a block diagram of a channel of a disc drive.

FIG. 2 provides a block diagram of a data receiver 200 which some embodiments of the present invention utilize. Data receiver 200 receives an analog read signal 202 from a preamplifier, which amplifies a signal produced by a read head, such as a read head on a slider 110 of FIG. 1. Analog read signal 202 is filtered by a continuous time filter 204 to remove noise.

The output of filter 204 is provided to an equalization filter 208. Under one embodiment, equalization filter 208 is a finite impulse response (FIR) filter, which modifies the values based on FIR tap coefficients stored in registers 214. In one particular embodiment, registers 214 are constructed of eight separate 8-bit registers 230, 232, 234, 236, 238, 240, 242, and 244 that each contain a single tap coefficient. The coefficients in register 214 are designed to shape the digital values toward an equalization target stored in target registers 210.

The equalized values produced by FIR filter 208 are converted into a series of digital values by an analog-to-digital (A/D) convertor 206. (Note that although FIR filter 208 is shown before A/D convertor 206 in FIG. 2, in other embodiments, FIR filter 208 is positioned after A/D convertor 206 and shapes the digital values produced by the convertor.) The series of digital values is then provided to a Viterbi Detector 216, which identifies data values from the equalized digital values based on the equalization target in target registers 210. The detected data values are provided to a post processor 218, which performs further parity error checking and correction to produce a final channel output 220.

The characteristics of the read signal provided to FIR filter 208 change over time due to a number of factors including: variances in the read head position within a track, variances in the speed at which the disc is spinning, and white noise generated by the read head. As a result, the filter must continuously adapt its coefficients in order to achieve the target equalization. This means that at certain time intervals, the filter enters an adaptation mode. In the adaptation mode, FIR filter 208 adjusts its tap coefficients in FIR coefficients registers 214 until the FIR filter is able to equalize the data so that the equalization result matches a target stored in target registers 210. The filter determines if it has met the target by measuring an error between the target equalization and the actual equalization, which is detected using a feedback path 224 extending from the output of Viterbi detector 216 to FIR filter 208. In general, the coefficients are updated around a set of default values that represent the most likely values needed to properly shape the read signal. This reduces the amount of searching that is needed to identify the proper coefficients.

Figure 3:
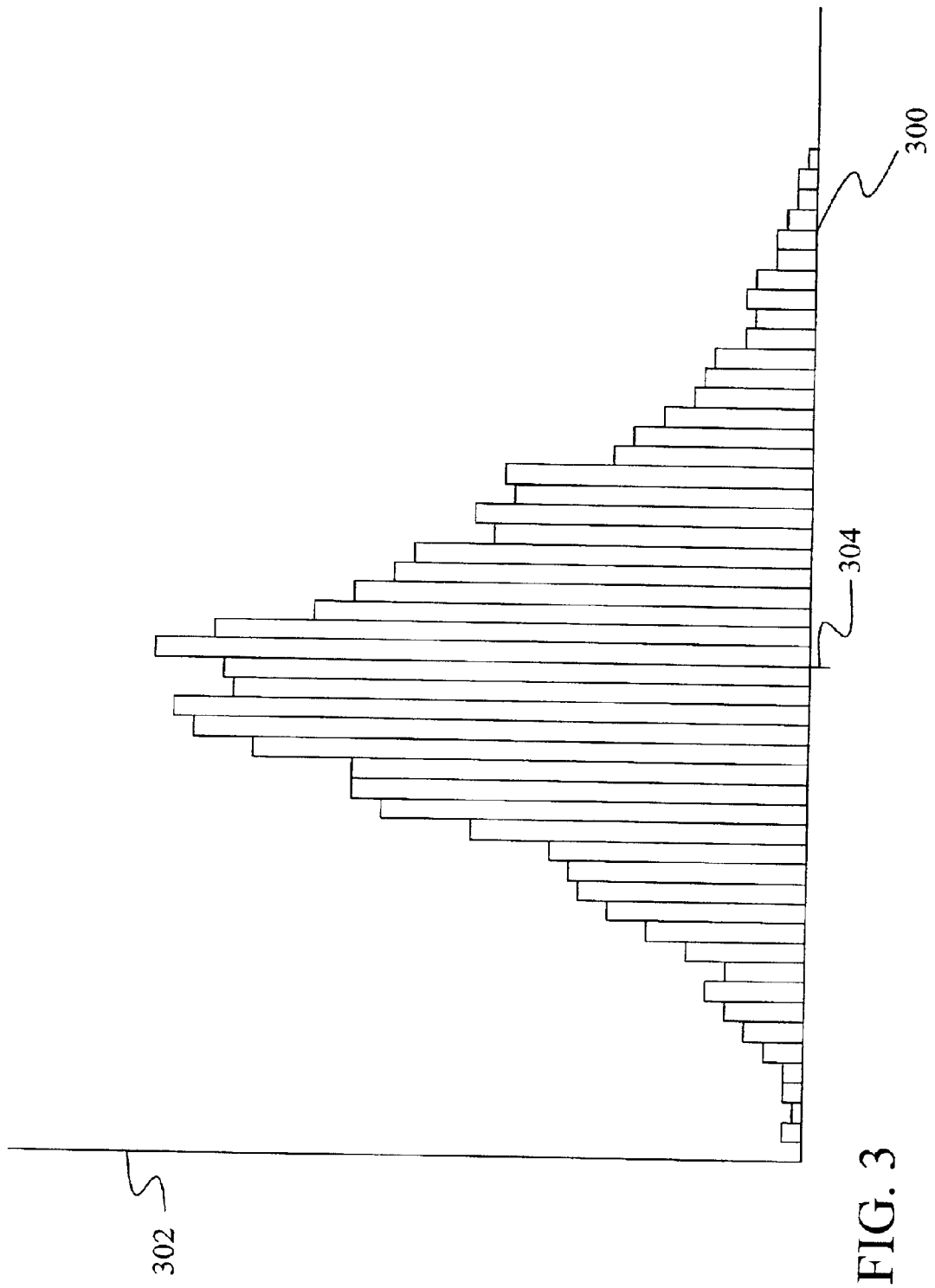
FIG. 3 is a chart showing the frequency of various values for a filter coefficient.

The present inventors have found that the likelihood that a coefficient will be set to a particular value can be described by a normal distribution centered on the default value for the coefficient. For example, FIG. 3 provides a graph of a frequency count of values of a coefficient, where the values of the coefficients are shown along horizontal axis 300 and the number of times the coefficient was set to a value is shown along vertical axis 302. As can be seen, the coefficient is equally likely to take on a value above and below a center point value 304, which is the default value for the coefficient.

Because it is equally likely that a coefficient will be at a value above or below the default value, a comparison between the default value and the coefficients is equivalent to a random coin toss. Recognizing this, the present invention forms a random number by performing a separate comparison for each tap register to generate a separate bit of the random number. Specifically, for tap coefficient values of TAPW1R, TAPW2R, TAPW3R, TAPW5R, TAPW6R, TAPW7R, TAPW8R, and TAPW9R and respective default values of DV1, DV2, DV3, DV5, DV6, DV7, DV8, and DV9, the construction of bits BIT0, BIT1, BIT2, BIT3, BIT4, BIT5, BIT6, and BIT7 of an 8-bit random value is described as:
BIT0=1 If TAPW1R>DV1; Otherwise, BIT0=0.
BIT1=1 If TAPW2R<=DV2; Otherwise, BIT1=0.
BIT2=1 If TAPW3R>DV3; Otherwise, BIT2=0.
BIT3=1 If TAPW5R<=DV5; Otherwise, BIT3=0.
BIT4=1 If TAPW6R>DV6; Otherwise, BIT4=0.
BIT5=1 If TAPW7R<=DV7; Otherwise, BIT5=0.
BIT6=1 If TAPW8R>DV8; Otherwise, BIT6=0.
BIT7=1 If TAPW9R<=DV9; Otherwise, BIT7=0.
where the default value is alternately grouped with different sides of the distribution to improve the randomness of the overall 8-bit value.

Figure 4:
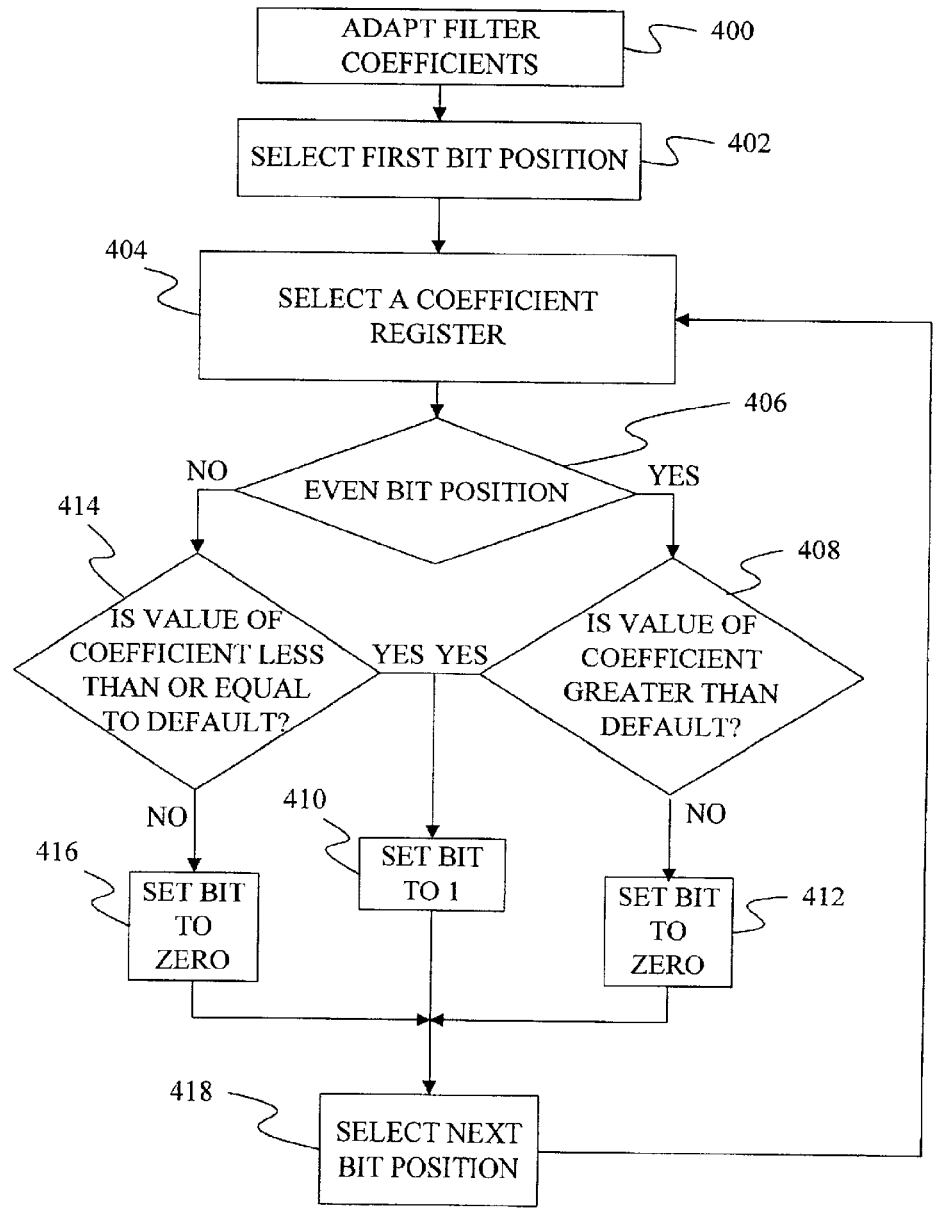
FIG. 4 is a flow diagram of a method for generating random numbers under embodiments of the present invention.

FIG. 4 provides a flow diagram for determining a random number 252 under embodiments of the present invention. In step 400, the tap coefficients for the FIR filter are adapted based on the read signal and the equalization target. A first bit position of random number 252 and a first coefficient register are then selected by a processor 250 at steps 402 and 404 respectively. At step 406, the selected bit position is examined to determine if it is an even bit position (such as bit 0, bit 2, bit 4 or bit 6) or an odd bit position (such as bit 1, bit 3, bit 5, or bit 7). If the bit position is an even bit position, the process continues at step 408 where processor 250 compares the value in the selected coefficient register to the default value of the register stored in a default values register 254, to determine if the coefficient value is greater than the default. If the coefficient value is greater than the default, processor 250 sets the selected bit position of random number 252 to one at step 410. If the coefficient value is not greater than the default, the selected bit position is set to zero at step 412. If the selected bit position is an odd bit position at step 406, the process continues at step 414 where the coefficient value is compared to the default value to determine the coefficient value is less than or equal to the default value. If the coefficient value is less than or equal to the default value, the selected bit position is set to one at step 410. Otherwise, the selected bit position is set to zero at step 416.

After a value has been chosen for the selected bit position at step 410, 412 or 416, a next bit position is selected at step 418. The process then returns to step 404 to select a new coefficient register. The steps between steps 404 and 418 are then repeated until each bit of the random number has been set.

Using an autocorrelation test and a power spectral density test, the present inventors have found that the method of FIG. 4 generates truly random numbers. In particular, the autocorrelation between two random numbers formed through the process of FIG. 4 has been found to be near zero indicating that the value of one random number does not predict the value of the next random number. In addition, the power spectral density for the frequency of occurrence of each random number has been found to be relatively constant.

Note that the method of FIG. 4 does not require any additional hardware in the data receiver. The tap coefficient registers are already present in most data receivers that perform equalization, and a processor (not shown) in the receiver is already capable of accessing those registers to determine the values stored in the registers. All that must be added to generate the random numbers is a computer program to compare the values in the coefficient registers to the default values for those registers and to use the results of those comparisons to form the random number as shown in FIG. 4 above. Since no additional hardware is needed, the present invention can be implemented without increasing the cost of the data receiver.

Note that although the present invention has been described with reference to a data storage device, such as a disc drive, the present invention can be used in any data receiver in which a filter is used to shape the read signal to meet a target and where coefficients that define the operation of the filter are at least periodically updated to improve the performance of the filter. For example, the present invention may be used in a digital television receiver, a satellite receiver, or a digital phone receiver.

In summary, a method is provided for generating a random number (such as 252) in a data receiver (such as 200) that receives an input signal (such as 202). The method includes setting at least one filter coefficient value (such as 230, 232, 234, 236, 238, 240, 242, and 244) used by a filter (such as 208) to filter the input signal. The filter coefficient value (such as 230, 232, 234, 236, 238, 240, 242, and 244) is compared to a default value (such as 254) for the filter coefficient (such as 230, 232, 234, 236, 238, 240, 242, and 244). At least one bit of the random number (such as 252) is set based on the comparison between the filter coefficient values (such as 230, 232, 234, 236, 238, 240, 242, and 244) and the default value (such as 254).

In other embodiments, a random number generator is provided for generating a random number (such as 252). The random number generator includes a filter (such as 208) for filtering an input signal (such as 202) and a filter coefficient register (such as 214) containing at least one filter coefficient (such as 230, 232, 234, 236, 238, 240, 242, and 244) that determines how the input signal is filtered by the filter. A processor (such as 250) reads the filter coefficient (such as 230, 232, 234, 236, 238, 240, 242, and 244) stored in the filter coefficient register (such as 214) and generates at least one bit of the random number (such as 252) based on the filter coefficient (such as 230, 232, 234, 236, 238, 240, 242, and 244).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the channel while maintaining substantially the same functionality without departing from the scope and spirit of the present invention. In addition, although the preferred embodiment described herein is directed to a channel for data storage device, it will be appreciated by those skilled in the art that the teachings of the present invention can be applied to other signal devices that have channels and equalization filters, without departing from the scope and spirit of the present invention.

What is claimed is:

1. A method of generating a random number in a data receiver that receives an input signal, the method comprising:
    setting at least one filter coefficient value used by a filter to filter the input signal;
    comparing the filter coefficient value to a default value for the filter coefficient; and
    setting at least one bit of a random number based on the comparison between the filter coefficient value and the default value.

2. The method of claim 1 wherein setting a filter coefficient value comprises setting a filter coefficient value for an equalization filter.

3. The method of claim 2 wherein setting a filter coefficient value further comprises setting a filter coefficient value to shape the input signal toward an equalization target.

4. The method of claim 1 wherein setting at least one filter coefficient value further comprises setting a plurality of filter coefficient values.

5. The method of claim 4 wherein comparing the filter coefficient value to a default value further comprises comparing each of the filter coefficient values to a respective one of a plurality of default values.

6. The method of claim 5 wherein setting at least one bit of the random number further comprises setting one respective bit of the random number based on each respective comparison between a coefficient value and a default value.

7. The method of claim 6 wherein setting one respective bit of the random number further comprises:
    determining if the bit is in an even bit position or an odd bit position;
    if the bit is in an even bit position, setting the bit to a first value if the filter coefficient value is greater than the default value and setting the bit to a second value if the filter coefficient value is not greater than the default value; and
    if the bit is in an odd bit position, setting the bit to the first value if the filter coefficient value is less than or equal to the default value and setting the bit to the second value if the filter coefficient value is not less than or equal to the default value.

8. The method of claim 1 wherein setting at least one bit comprises setting the bit to a first value if the filter coefficient value is greater than the default value and setting the bit to a second value if the filter coefficient value is not greater than the default value.

9. A random number generator for generating a random number, the generator comprising:
    a filter for filtering an input signal;
    a filter coefficient register containing at least one filter coefficient that determines how the input signal is filtered by the filter; and
    a processor that reads the filter coefficient stored in the filter coefficient register and generates at least one bit of the random number based on the filter coefficient.

10. The random number generator of claim 9 wherein the processor generates the at least one bit of the random number by comparing the filter coefficient to a default value.

11. The random number generator of claim 10 wherein the processor sets the at least one bit to a first value if the filter coefficient is greater than the default value and to a second value if the filter coefficient is not greater than the default value.

12. The random number generator of claim 9 wherein the filter forms part of a data receiver.

13. The random number generator of claim 12 wherein the filter forms part of a read channel in a data storage device.

14. The random number generator of claim 9 wherein the filter coefficient register contains eight filter coefficients.

15. The random number generator of claim 9 wherein the filter is an equalization filter that attempts to equalize the input signal toward a target.

16. A random number generator comprising:
    filter coefficient registers that contain filter coefficients for a filter; and
    processing means for accessing the filter coefficients in the filter coefficient registers and using the filter coefficients to generate a random number.

17. The random number generator of claim 16 wherein the processing means uses the filter coefficients to generate the random number by comparing each filter coefficient to a respective default value.

18. The random number generator of claim 16 wherein the processing means selects a first value for a digit in the random number if a filter coefficient is greater than a default value and a second value for the digit in the random number if the filter coefficient is not greater than the default value.

19. The random number generator of claim 16 wherein the filter is a finite impulse response filter.

20. The random number generator of claim 16 wherein the random number generator forms part of a data storage device and the wherein the filter is used to filter a read signal generated from a medium in the storage device.

* * * * *